(12) United States Patent
Lyon et al.

(10) Patent No.: US 10,810,444 B2
(45) Date of Patent: Oct. 20, 2020

(54) AUTOMATED CAPTURE OF IMAGE DATA FOR POINTS OF INTEREST

(71) Applicant: Apple Inc., Cupertino, CA (US)

(72) Inventors: Benjamin B. Lyon, Saratoga, CA (US); Ahmad Al-Dahle, San Jose, CA (US); Xinyu Xu, Cupertino, CA (US)

(73) Assignee: Apple Inc., Cupertino, CA (US)

(*) Notice: Subject to any disclaimer, the term of this patent is extended or adjusted under 35 U.S.C. 154(b) by 142 days.

(21) Appl. No.: 15/762,546

(22) PCT Filed: Sep. 22, 2016

(86) PCT No.: PCT/US2016/053175
§ 371 (c)(1),
(2) Date: Mar. 22, 2018

(87) PCT Pub. No.: WO2017/053612
PCT Pub. Date: Mar. 30, 2017

(65) Prior Publication Data
US 2019/0080180 A1 Mar. 14, 2019

Related U.S. Application Data

(60) Provisional application No. 62/233,179, filed on Sep. 25, 2015.

(51) Int. Cl.
G06K 9/00 (2006.01)
G06K 9/32 (2006.01)
G06T 11/60 (2006.01)

(52) U.S. Cl.
CPC ....... *G06K 9/00791* (2013.01); *G06K 9/3233* (2013.01); *G06T 11/60* (2013.01); *G06K 2209/27* (2013.01)

(58) Field of Classification Search
CPC ............. G06K 9/00791; G06K 9/3233; G06K 2209/27; G06T 11/60
See application file for complete search history.

(56) References Cited

U.S. PATENT DOCUMENTS

2007/0070069 A1  3/2007  Samarasekera et al.
2008/0268876 A1  10/2008  Gelfand et al.
(Continued)

FOREIGN PATENT DOCUMENTS

EP  2863338  4/2015
JP  2015079497  4/2015
WO  2009097449  8/2009

*Primary Examiner* — Xin Jia
(74) *Attorney, Agent, or Firm* — Robert C. Kowert; Kowert, Hood, Munyon, Rankin & Goetzel, P.C.

(57) ABSTRACT

Automated capture of image data for points of interest may be implemented for points of interest in an environment external to a vehicle. Sensors implemented as part of a vehicle may collect sensor data for an environment. Processing of the sensor data may be performed to detect points of interest in the environment. In response to detecting a point of interest, image data may be captured by one or more of the sensors implemented at the vehicle. Different types of image data may be captured, such as panoramic images and three-dimensional reconstructions of a scene. Metadata may be generated for captured image data which may describe the point of interest that is captured by the image data. The image data and the metadata may be stored locally at the vehicle or to a remote data store. The image data may also be shared with other computing devices.

20 Claims, 7 Drawing Sheets

(56) References Cited

U.S. PATENT DOCUMENTS

| | | |
|---|---|---|
| 2008/0320036 A1 | 12/2008 | Winter |
| 2010/0166256 A1 | 7/2010 | Kmiecik et al. |
| 2010/0256863 A1* | 10/2010 | Nielsen .................. G07C 5/085 |
| | | 701/31.4 |
| 2015/0151725 A1* | 6/2015 | Clarke .................. B60W 40/06 |
| | | 701/28 |
| 2015/0178884 A1* | 6/2015 | Scholl .................... G06T 3/0018 |
| | | 348/36 |

* cited by examiner

AUTOMATED CAPTURE OF IMAGE DATA FOR POINTS OF INTEREST

This application is a 371 of PCT Application No. PCT/US2016/053175, filed Sep. 22, 2016, which claims benefit of priority to U.S. Provisional Patent Application No. 62/233,179, filed Sep. 25, 2015. The above applications are incorporated herein by reference. To the extent that any material in the incorporated application conflicts with material expressly set forth herein, the material expressly set forth herein controls.

BACKGROUND

The rise of interest in automated control and navigation of vehicles has led to the inclusion of different types of remote sensing equipment installed on vehicles. These sensors can include one or more radars, ultrasonic sensors, light beam scanning devices, visible light camera devices, infrared camera devices, near-infrared camera devices, depth camera devices which can include one or more light-scanning devices, including LIDAR devices, etc. Automated navigation and control systems may process data collected by the sensors in order to detect and characterize objects in the environment. However, the collected sensor data may also be utilized to provide other services.

SUMMARY

Sensors implemented as part of a vehicle may collect sensor data for an environment. Processing of the sensor data may be performed to detect points of interest in the environment. In response to detecting a point of interest, image data may be captured by one or more of the sensors implemented at the vehicle. Different types of image data may be captured, such as panoramic images and three-dimensional reconstructions of a scene. Metadata may be generated for captured image data which may describe the point of interest that is captured by the image data. The image data and the metadata may be stored locally at the vehicle or to a remote data store. The image data may also be shared with other computing devices.

Figure 1:
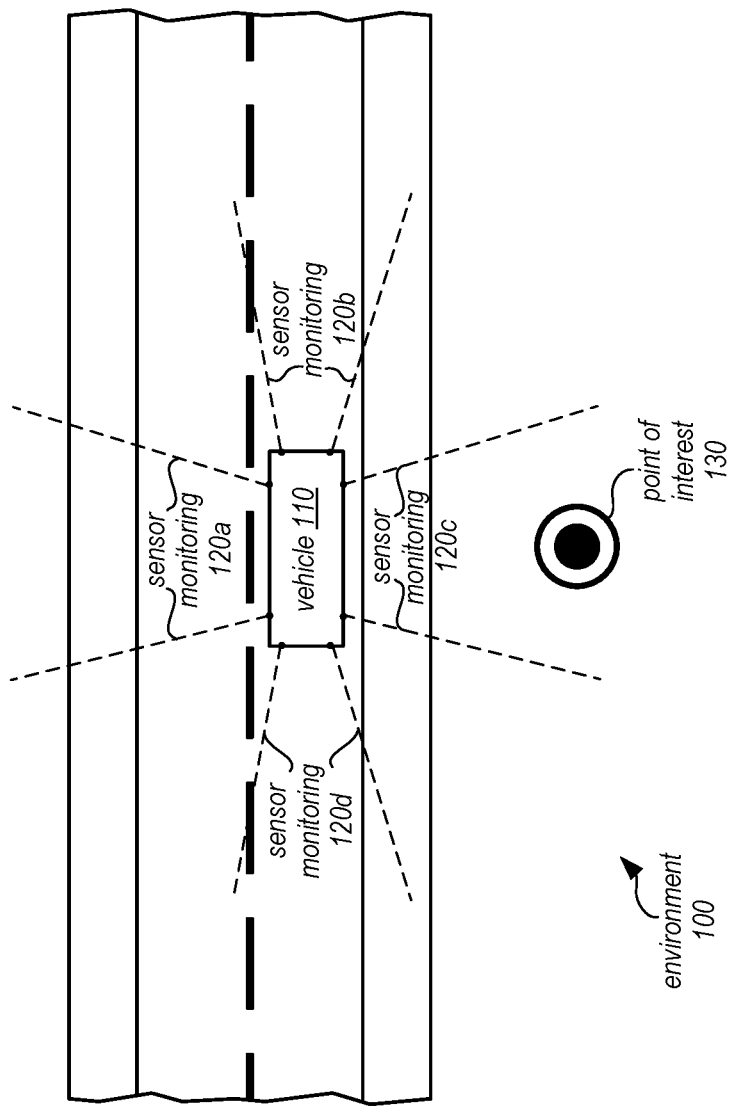
FIG. 1 illustrates a view of an environment that includes a point of interest detected by a vehicle, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f), for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement automated capture of image data for points of interest. FIG. 1 illustrates a view of an environment that includes a point of interest detected by a vehicle, according to some embodiments. Environment 100 may be an area within the detection range of one or more sensors monitoring the environment external to vehicle 110. For example, as illustrated in FIG. 1, different types of sensors, such as radars, ultrasonic sensors, light beam scanning devices, visible light camera devices, infrared camera devices, near-infrared camera devices, depth camera devices which can include one or more light-scanning devices, including LiDAR devices. Monitoring 120 may be performed based on such sensors to monitor the same or different portions of the environment 100 (e.g., sensor monitoring 120a, 120b, 120c and 120d) to detect a point of interest 130.

A point of interest may be a scene, event, or object in the environment external to the vehicle that may be captured for historical interest as part of a route, trip, itinerary, or journey undertaken by the vehicle. For example, a sunset ocean view, a famous landmark (e.g., the Brooklyn Bridge), a passing parade, or wildlife may be points of interest which a passenger or user of vehicle 110 may wish to capture for a historical record of the trip in image data. Various kinds of machine vision, computer vision, and/or pattern recognition may be performed on the sensor data to detect points of interest automatically, without user input, as discussed below with regard to FIG. 5. In some embodiments, an interface may be provided which may receive manual requests to capture image data for points of interest (e.g., via graphical user interface or audible voice command).

Once point of interest 130 is detected, image data of the point of interest 130 may be captured. For example, streaming sensor data (e.g., live video data) may be recorded. In addition to capturing the image data for the point of interest 130, metadata describing the point of interest may be generated. For example, image data captions and other descriptive information, such as time of day, location, or environmental conditions (e.g., weather) may be generated for the point of interest. In this way, intelligent descriptive information may be stored for accessing and processing image data capture for different points of interest.

Figure 2:
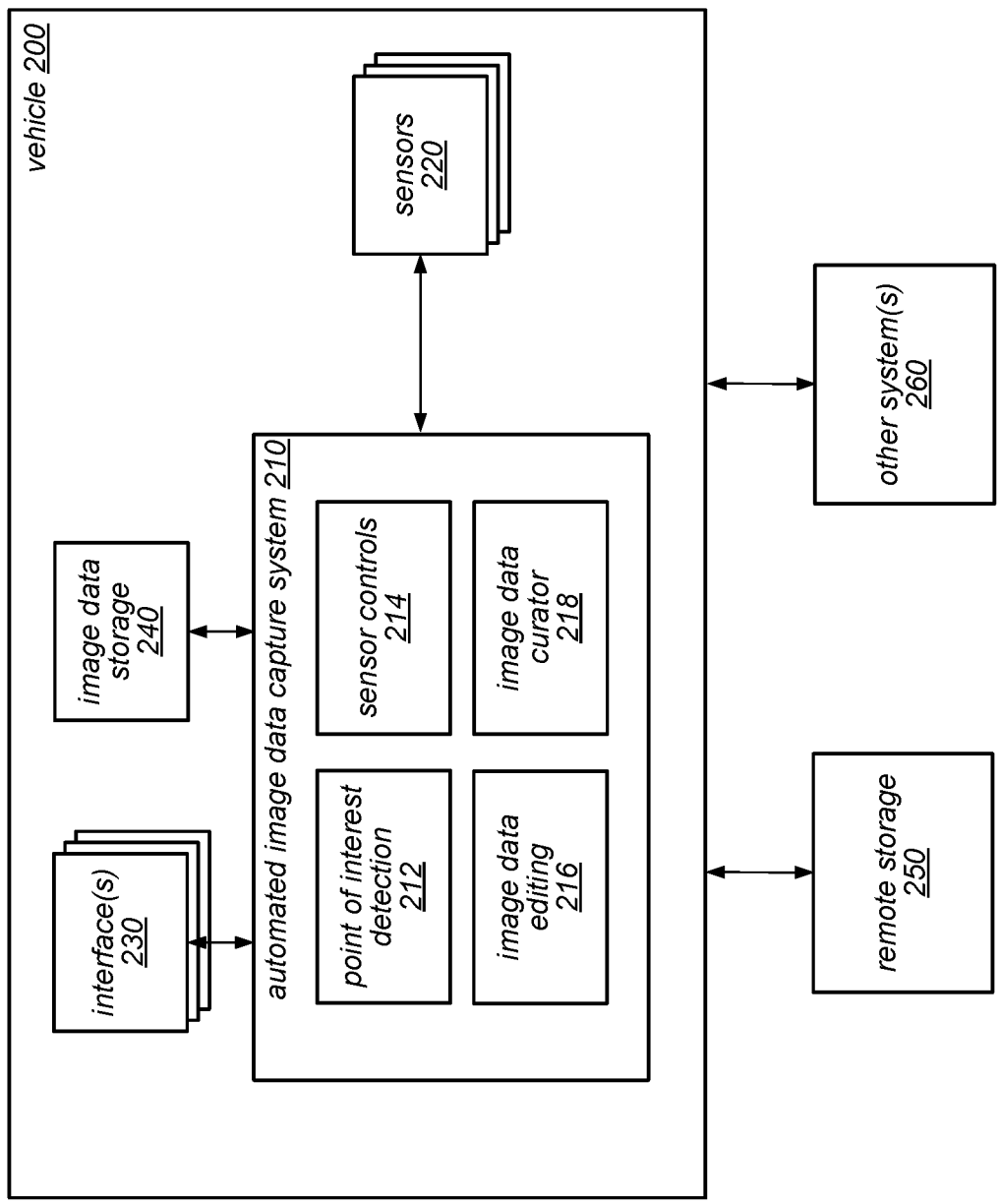
FIG. 2 illustrates a logical block diagram of a vehicle which implements an automated image data capture system that captures image data for points of interest, according to some embodiments.

FIG. 2 illustrates a logical block diagram of a vehicle which implements an automated image data capture system that captures image data for points of interest, according to some embodiments. Vehicle 200 includes an automated image capture system, a set of one or more sensors 220, a set of one or more user interfaces 230, and image data storage 240. As referred to herein, vehicle 200 can include one or more various embodiments of vehicles, including one or more of a land vehicle (e.g., an automobile, truck, etc.), aircraft, watercraft, etc. Sensors 220 include devices which monitor one or more aspects of an external environment in which the vehicle is located. Monitoring an aspect of an external environment can include generating, at the sensor, sensor data which includes information regarding the aspect of the external environment. Sensor data generated by a sensor can include a sensor data representation of one or more portions of an environment, including a sensor data representation of one or more objects located within the environment. A sensor 220 can include one or more of a camera device which generates images of one or more portions of the external environment, a light beam scanning device which generates one or more point clouds of one or more portions of the external environments, a radar which generates radar data associated with one or more portions of the external environment, etc. Objects included in an external environment which can be monitored include one or more static elements, dynamic elements, etc. included in the environment. For example, a sensor 220 which includes a camera device can capture images of an external environment which includes images of static elements, including roadway lane boundary markers, roadway curbs, inanimate obstacles in the roadway, etc., images of dynamic elements including traffic participants, fauna, ambient environment conditions, weather, or other scenery surrounding vehicle 200.

The one or more user interfaces 230, also referred to herein interchangeably as input interfaces, can include one or more control interfaces with which an occupant of the vehicle 200 can interact with to interact with automated image capture system 210. For example, interfaces 230 may include physical control buttons, nobs, or other input devices, graphical user interfaces displayed on touch sensitive displays, and/or microphones and voice detection/processing systems that can recognize voice commands.

Automated image capture system 210 may implement various components to perform automated capture of image data for points of interest. For instance, point of interest detection module 212 may be implemented to perform various kinds of machine vision analysis, computer vision analysis, or location based analysis of sensor data to recognize points of interest (e.g., according to the various techniques discussed below with regard to FIG. 5) and trigger the capture and storage of the image data. Point of interest detection 212 may also be configured to generate metadata for captured image data for points of interest. Sensor controls module 214 may be configured to interact with sensors 220 to collect specific information requested by a user via interfaces 230, such as the different types of images (e.g., three-dimensional or panoramic discussed below at FIG. 3). Image data editing 216 may be implemented to perform various operations for image data captured for a detected point of interest (such as adding, removing or modifying captured image data). Image data curator 218 may perform various operations to curate image data, by organizing image data in image data storage 240 for access. In some embodiments, image data curator 218 may automatically generate a compilation of image data, such as discussed below with regard to FIG. 6. Captured image data may be stored image data storage 240 (which may provide local persistent storage, such as block-based storage devices, like hard disk drives or solid state drives). In some embodiments vehicle 200 may upload captured image data to a remote storage 250, which may be a storage service that provides access to capture image data associated with a particular account. In this way captured image data may be access via other display systems, such as home entertainment systems or mobile devices, in order to share the capture image data with other users outside of the vehicle. Other systems 260 may provide mapping services, remote computation services (e.g., for point of interest detection) or other services which may perform portions of the described techniques.

Please note that users can selectively block use of, or access to, personal data, such as image data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

Figure 3:
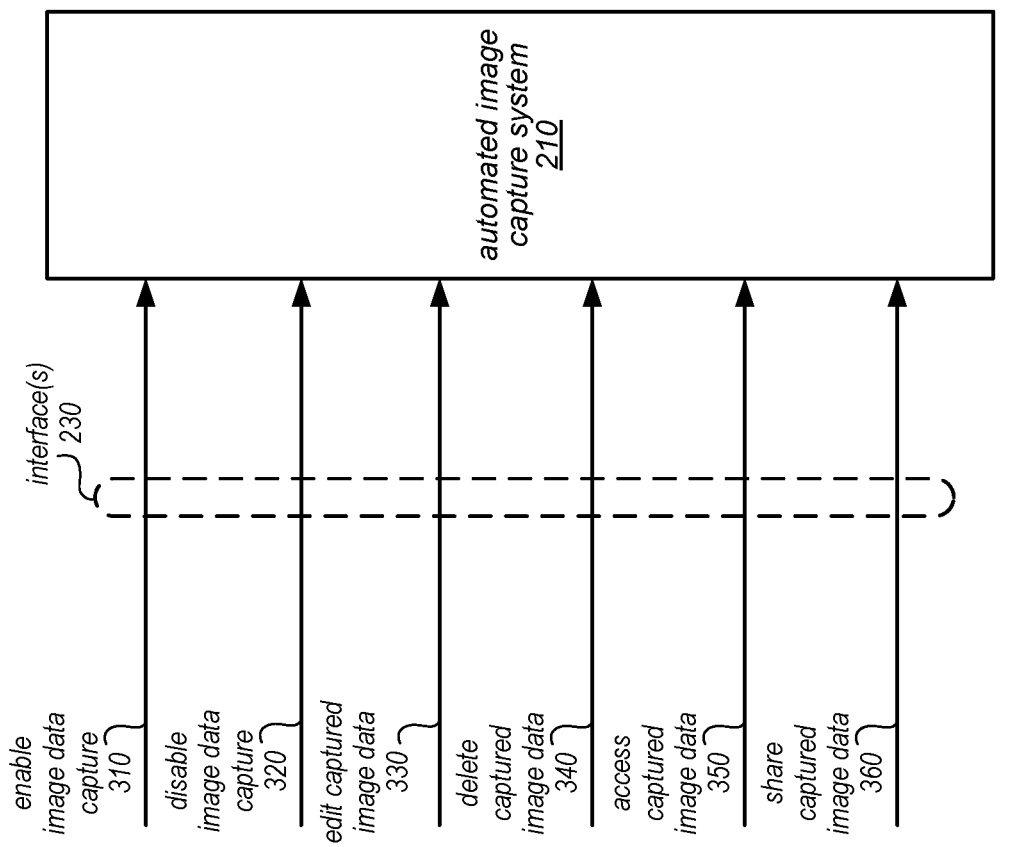
FIG. 3 illustrates interactions with an automated image data capture system, according to some embodiments.

FIG. 3 illustrates interactions with an automated image data capture system, according to some embodiments. The interface(s) 230 discussed above may be configured to provide many possible interactions with automated image capture system 210. For example, requests 310 to enable image data capture 310 may be sent via interface(s) 230 to automated capture system 210. A request to enable image data may allow for the capture of different types of image data from one or more multiple sensors. For instance, particular views provided by particular image sensors (e.g., front, rear, or side image sensors may be selected). In some embodiments, the request to enable image data capture may be a request to enable a certain type of image data capture. For example, the request may be a request to generate a panoramic view utilizing image data from multiple sensors (e.g., a 180 degree or 360 degree view). In another example, the request may be made to create a three-dimensional map or model of an object or scene. For instance, a vehicle may travel around a structure, such as a house or office building, and combine image data from different viewpoints captured while driving around the structure to generate a three-dimensional model of the structure (e.g., stitching together different images and/or warping images).

A request to disable image data capture 320 may also be sent via interface(s) 230 to automated image capture system 210. For example, automated image capture system 210 may capture image data for a point of interest that is automatically detected. An indication of the capture of image data may be displayed to a user who may wish to cancel the image data capture (e.g., because the point of interest is not of interest to the user). Thus the disable request 320 may be sent via the interface to halt image capture.

Multiple different requests to edit captured image data 340 may be sent via interface(s) 230 to automated image capture system 210. For example, a display may provide different touch interface options to add or modify image data captured. Special effects, such as changing image data from color to grayscale (and vice versa), as well as various other special imaging effects may be provided. Operations to improve the appearance of image data (e.g., altering contrast, brightness, hue or saturation) or special effects to remove blemishes (e.g., red-eye removal effects) may also be provided as editing requests 330 which may be received. Additional, requests to delete captured image data 340 may be received which may remove captured image data from local or remote storage.

Requests to access captured image data 350 may be provided via interface in order to play back or display captured image data. For example, a media player interface may be provided that allows a user to select different image data related to different points of interest for display. As discussed below, in some embodiments, a compilation of image data for related points of interest may be automatically generated. Therefore, access requests 350 may be requests to access the automatically generated compilation of image data for playback or display (or further editing).

Requests to share captured image data 360 may be received via interface(s) 230 at automated image capture system 210. For example a request may indicate a social media platform or website to which the image data may be published. In turn automated image capture system 210 may interface with the identified social media platform or website to publish the image data under an identified user account associated with a user requesting the publishing of the image data. In some embodiments, a request 360 to share captured image data may identify authorized user accounts or computing devices which may access image data stored locally at the vehicle or at a remote data store, such as remote storage 250.

Figure 4:
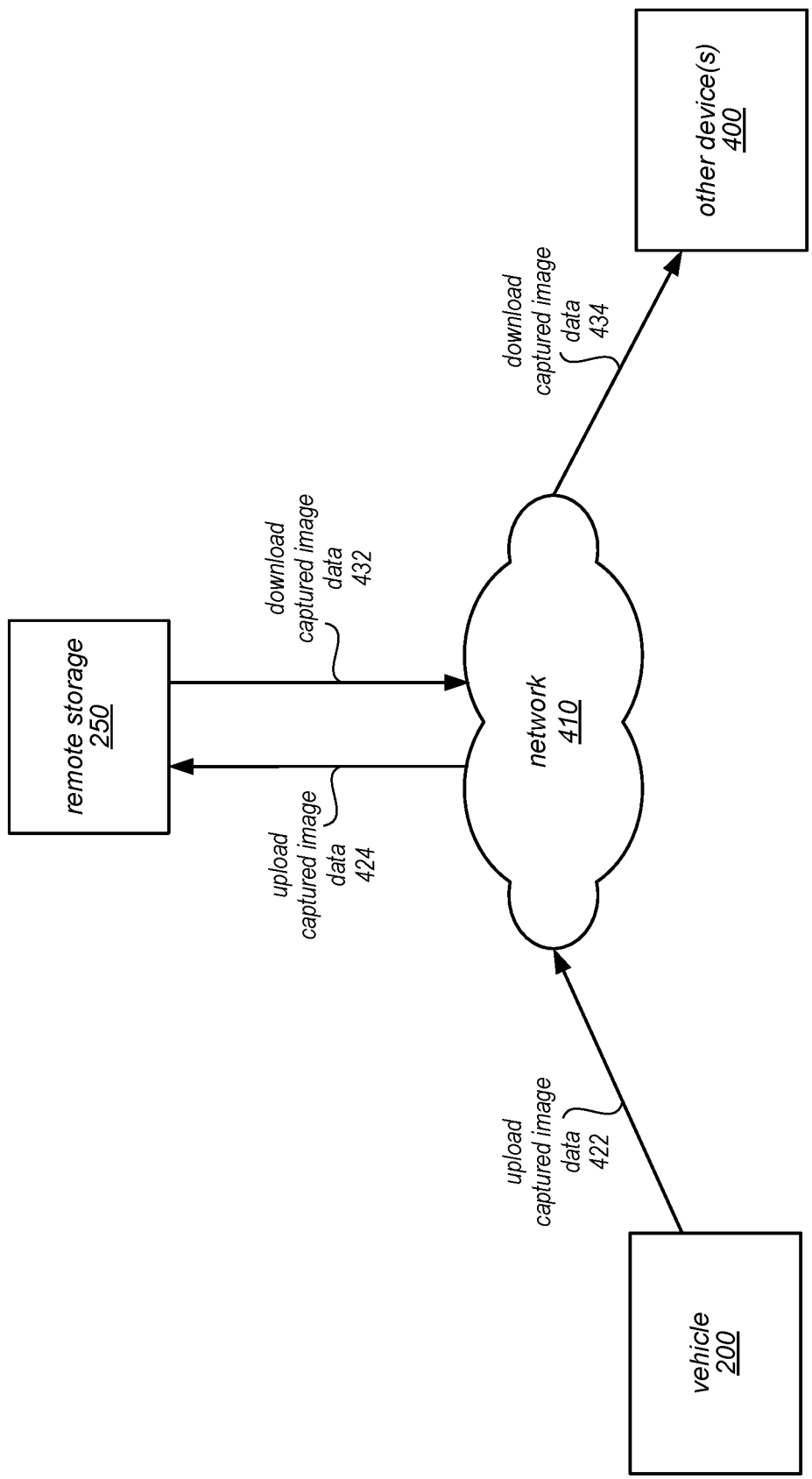
FIG. 4 illustrates interactions to share captured image data for a point of interest, according to some embodiments.

FIG. 4 illustrates interactions to share captured image data for a point of interest, according to some embodiments. Vehicle 400 may be configured to access network 410. For example, network 410 may be a wide area network, such as the Internet, which vehicle 200 may access through radio signals sent to a wireless tower that provides a gateway to network 410. When image data for a point of interest is captured, vehicle 200 may be configured to upload the captured image data 422 to remote storage 250 via network 410 which may direct the upload of captured image data 424 to remote storage 250.

Other device(s) 400, which may be mobile computing devices, or other computing systems such as computing system 700, may obtain access to remote storage 250. For example, other device(s) 400 may supply access credentials, such as a username and password, to be allowed to retrieve captured image data. In some embodiments, a request may be made (not illustrated) from an authorized mobile computing device associated with a user account storing the captured image data that identifies and/or authorizes other device(s) 400 to obtain the captured image data.

Alternatively, image data stored at vehicle 200 may be shared directly via network 410 with other device(s) 400. For example, various data transfer protocols (e.g., email or file transfer protocol) in some embodiments, may be utilized send captured image data from vehicle 200 to other device(s) 400. Other communication networks, channels, or protocols, such as Multimedia Message Service (MMS), Bluetooth or other communication channels, or near field communications may be utilized to send captured image data to other device(s) 400.

Figure 5:
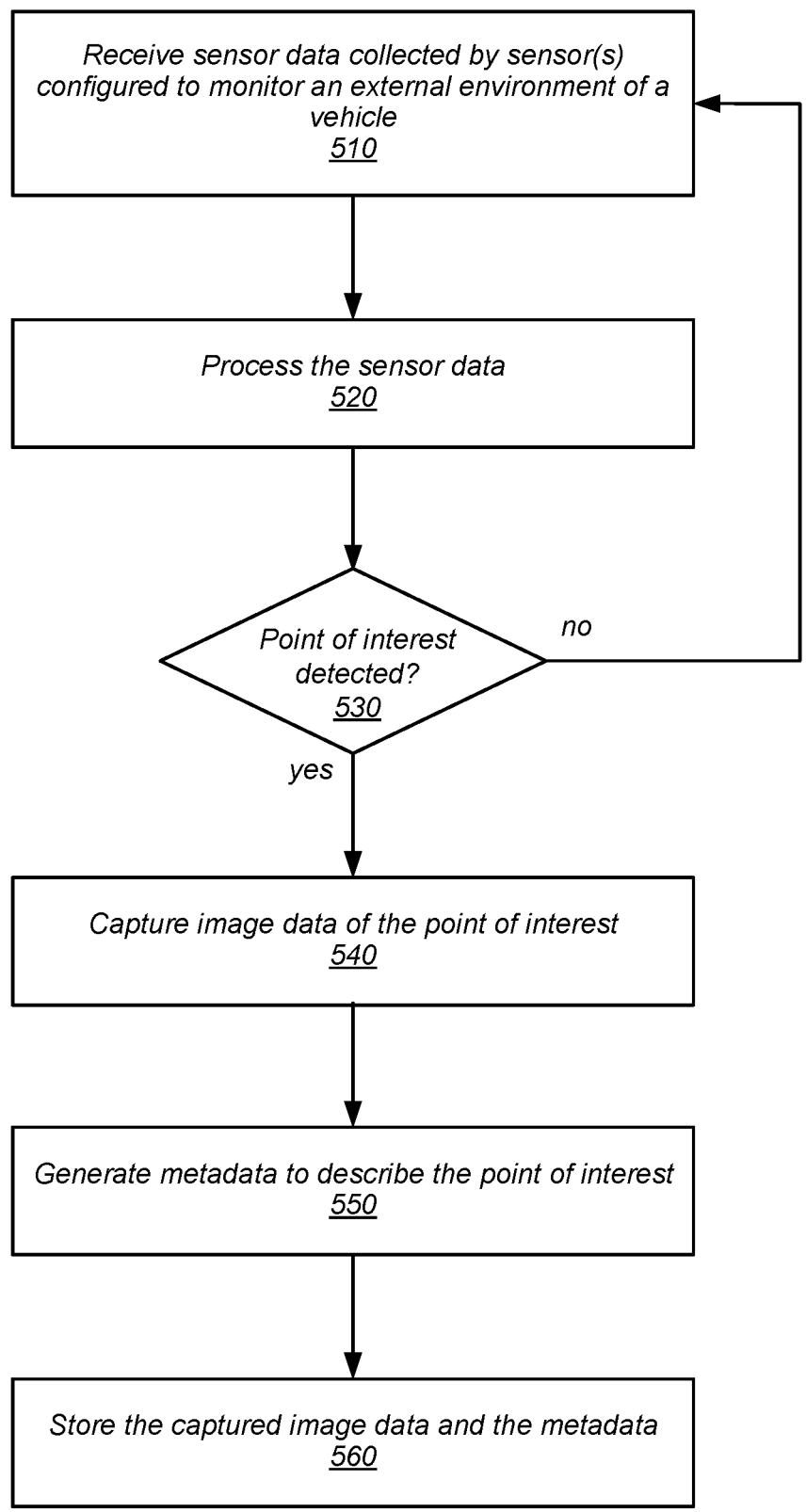
FIG. 5 is a high-level flowchart illustrating various methods and techniques to implement automated capture of image data for points of interest, according to some embodiments.

FIGS. 2-4 provide examples of a vehicle that may implement automated capture of image data for points of interest. However, numerous other types or configurations of vehicles or other systems may implement sensors via which points of interest may be detected and image data captured. FIG. 5 is a high-level flowchart illustrating various methods and techniques to implement automated capture of image data for points of interest, according to some embodiments. The various components described above may implement these techniques (in addition to those described with regard to FIG. 6) as well as various other systems.

As indicated at 510, sensor data may be received that is collected by sensor(s) configured to monitor the external environment of a vehicle, in various embodiments. For instance the various types of sensors described above with regard to FIGS. 1 and 2, such as radars, ultrasonic sensors, light beam scanning devices, visible light camera devices, infrared camera devices, near-infrared camera devices, depth camera device that can include images or data describing one or more portions of the environment external to the vehicle.

As indicated at 520, the sensor data may be processed to synthesize, characterize, and/or analyze the environment external the vehicle. As the vehicle may be moving, sensor data processing may dynamically update understandings of the environment determined from sensor data. For example, an existing world model, map, or other representation of the external environment may be continuously updated as new sensor data is received. In at least some embodiments, sensor data processing may include real time image data processing to perform various types of machine or computer vision analysis and pattern recognition techniques of visible light image data (e.g., live video or still frames) to detect points of interest external to the vehicle.

A point of interest, as noted above, may be a scene, event, or object in the environment external to the vehicle that may be captured for historical interest as part of a route, trip, itinerary, or journey undertaken by the vehicle. For example, points of interest may include designated historical, scenic, or other types of markers identifying an area of interest or significance. Natural scenery or other permanent points of interest, such as ocean, mountain, desert, or other geographic views may also be identified as a point of interest. Signs, or other markers of locations (e.g., restaurant signs, theme park signs, boundary signs. Various types of ephemeral points of interest (which may not always occur in the environment), such as singular events, may be detected as points of interest. For example, traffic jams or other travel conditions (e.g., weather) may be detected as points of interest, as can festivals, parades, or sporting events. Points of interest may also be captured that are related to a route or journey undertaken by the vehicle. A start point, end point, and other locations where the vehicle ceases traveling may be detected as points of interest.

Image data analysis may recognize points of interest according rules-based, knowledge-based and/or machine learning techniques. For example, different natural environmental features, such as beaches, cliff faces, forest vegetation may be recognized by performing different techniques, such as edge detection, segmentation, or other image processing techniques that may manipulate data to recognize objects or features in image data. In another example, facial recognition may be performed to detect large numbers of people in an external environment, which may indicate that an event is occurring which may be a point of interest for capture. Machine learning techniques may be implemented to improve the performance of point of interest detection. For example, previous inputs to annotate captured image data, or trigger the capture of image data may be tracked or recorded. Machine learning techniques, such as feature selection, may identify common features in the recorded inputs that are more indicative of points of interest and may update criteria used to detect points of interest to incorporate the identified features as part of a subsequent analysis.

In addition to various image processing, machine learning, and other techniques described above, sensor data may also indicate a location of the vehicle which may be used to detect points of interest. For example, a GPS receiver may provide a location coordinate which may be compared to a map or other model which indicates points of interest. If the vehicle is located so as to be within a proximity of the map-based identification of the point of interest (which can be confirmed utilizing other sensor data received, such as image data), then the point of interest may be detected for capture of image data. It may be that in some embodiments, a user interface may provide a map or other environmental model which a user may pre-select different locations on the map as points of interest to capture.

While point of interest detection may be performed automatically as sensor data is received, capture of image data for a point of interest may be manually triggered via command or request (as discussed above with regard to FIG. 3). For example, an interface may provide a touch input or other touch-based control to trigger the capture of image data. Similarly, audio input, such as a voice command to capture image data may be received. The requests to capture image data may specify a particular portion of an environment (e.g., in front of the vehicle, behind the vehicle) or may generally capture image data utilizing available image data sensors. For example, the requests may control or direct the capture of image data by panning, zooming, focusing, or otherwise manipulating sensors.

As indicated at 530, a point of interest may be detected as a result of processing the sensor data, in various embodiments. In response to detecting the point of interest, image data may be captured for the point of interest. For example, image data collected via one or more of the sensors (e.g., visual light cameras, light beam scanning devices) that includes the point of interest in a detection range may be recorded. Captured image data may be encoded, compressed, encrypted and/or otherwise formatted according to various techniques, such as MPEG. Audio capture sensors, such as microphones, may capture audio data to be synchronized with any image data captured in some embodiments.

In at least some embodiments, image data captured may be utilized to construct a three-dimensional map or model of a point of interest. For instance, different sensors implemented at the vehicle may capture different information which can be utilized to generate an image with depth (e.g., utilizing stereoscopic image techniques and multiple cameras). Three-dimensional mapping of a point of interest (or another manually chose scene) may be enabled or requested via a user interface.

As indicated at 540, metadata describing the point of interest may be generated. Metadata may include captions, tags, and other descriptors of image data that may describe the contents of the image data, including the point of interest. Metadata may be generated based on the various point of interest detection techniques discussed above, such as image data processing or location-based detection. Date, time, and location information may be used to generate metadata. For example, a date and time of day may be used to determine whether image data includes environmental conditions, such as sunrise or sunset. Weather records may also be accessed to determine whether conditions. The various sources of information and means for determining metadata may be combined. For instance, a location-based detection of a point of interest (e.g., location indicates that Mt. Rushmore is in the external environment of the vehicle), may be combined with other information, such as time of day and weather information to generate a caption for image data that provides more information than any one source used alone (e.g., "A sunny Friday morning at Mt. Rushmore").

As indicated at 550, the captured image data and the generated metadata may be stored. As discussed in FIGS. 2 and 4 above, captured image data may be stored locally at data storage in a vehicle and/or in storage remote from the vehicle (e.g., at a storage server implemented as part of a network-based storage service). Stored image data and metadata may be associated with a particular account so that various security mechanisms and controls may be implemented so that the privacy and integrated of captured image data is maintained, as noted earlier.

Access may be provided to stored image data. For example, replay systems or devices implemented as part of the vehicle, such as one or more electronic display devices may be implemented to play or display image data. Speakers may be utilized to project corresponding audio data collected along with the image data. Image data may be shared with other devices. For example, mobile computing devices, such as cell phones, tablet computers, laptops, or other systems, such as system 700 in FIG. 7, may be able to request and receive the image data captured for the point of interest.

In at least some embodiments, user input may be received via an interface to edit the stored image data and/or metadata. For example, a caption generated for a video segment may be amended or changed. New information, such as identities of persons captured in the image data, may be added to metadata. Various editing operations and/or effects may be applied to image data, in order to improve the quality of the image data, change the format or length of the image data, delete image data, or otherwise change captured image data or metadata may be performed in response to various inputs.

Figure 6:
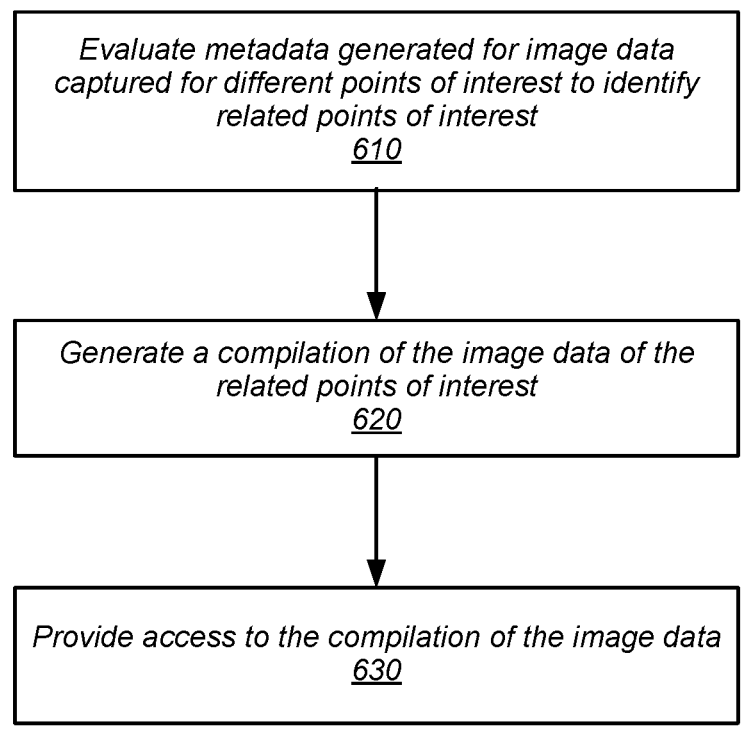
FIG. 6 is a high-level flowchart illustrating various methods and techniques to generate a compilation of image data for related points of interest, according to some embodiments.

In addition to generating metadata for image data captured for detected points of interest, other image curating operations may be applied to image data. For example, image data may be sorted or ordered in a file structure or directory so that related image data may be found. In some embodiments, image data corresponding to points of interest detected as part of a single trip or journey may be collocated. Additionally, operations may be performed to arrange or compile image data for display. For example, a virtual photo album or scrapbook may be generated. FIG. 6 is a high-level flowchart illustrating various methods and techniques to generate a compilation of image data for related points of interest, according to some embodiments.

As indicated at 610, metadata generated for different image data captured for different points of interest may be evaluated to identify related points of interest. For example, a journey start time and end time may be identified (e.g., by detecting when a vehicle leaves a home address and returns to a home address). A timeline of image data captured within the start time and end time may be determined in order to identify related image data. In some embodiments, computer and machine vision techniques may be implemented to analyze captured image data to select points of interest that are more relevant to a potential compilation of image data. For example, not all image data captured may be relevant or interesting. Consider image data captures associated with points of interest that are not directly depicting unusual sights or locations of a journey, such as restaurants or rest stops that were captured during a trip but are not particularly interesting when compared with other image data captured. Image processing techniques may be implemented to determine these less interesting image data captures do not include interesting or unique features (e.g., no natural scenery is recognized and/or a location associated with the captured image data is not near a designated landmark) and exclude them from being considered related (even though the image data may be captured within an identified timeline). In some embodiments, a user interface may display or present image data that may be considered related for further evaluation by a user. In this way, a user may include additional image data, or exclude identified image data, prior to the generation of a compilation.

As indicated at 620, a compilation of the image data of the related points of interest may be generated. Automated splicing, stitching, fading, and various other editing operations may be performed to generate the compilation. The metadata stored for the different image data may be used to provide text captions or descriptions of presented image data (whether still photos or video). Additionally, image data may be ordered or grouped in the compilation according to an analysis of metadata (e.g., grouping photos or video of similar people, recognized via facial recognition techniques, together in the compilation). In some embodiments, an interface may be provided to allow a user to overlay pre-recorded audio (e.g., music tracks) or record audio (e.g., voice over tracks) to include in the compilation. The compilation may be generated as a single file, which may be in a format that may be played by various kinds of media players (e.g. MPEG). Edits to the video compilation may be provided via a user interface, in some embodiments. For example, additional image data may be added, captions may be changed, the ordering of image data may be altered, or any other modification of the compilation of image data performed.

As indicated at 630, access may be provided to the compilation of the image data. For example, a display device or interface may be implemented as part of the vehicle may be configured to access the compilation and display the compilation. In some embodiments, as discussed above with regard to FIG. 4, the compilation may be uploaded to a remote data store, which may be accessible by other computing devices to access the uploaded compilation.

Figure 7:
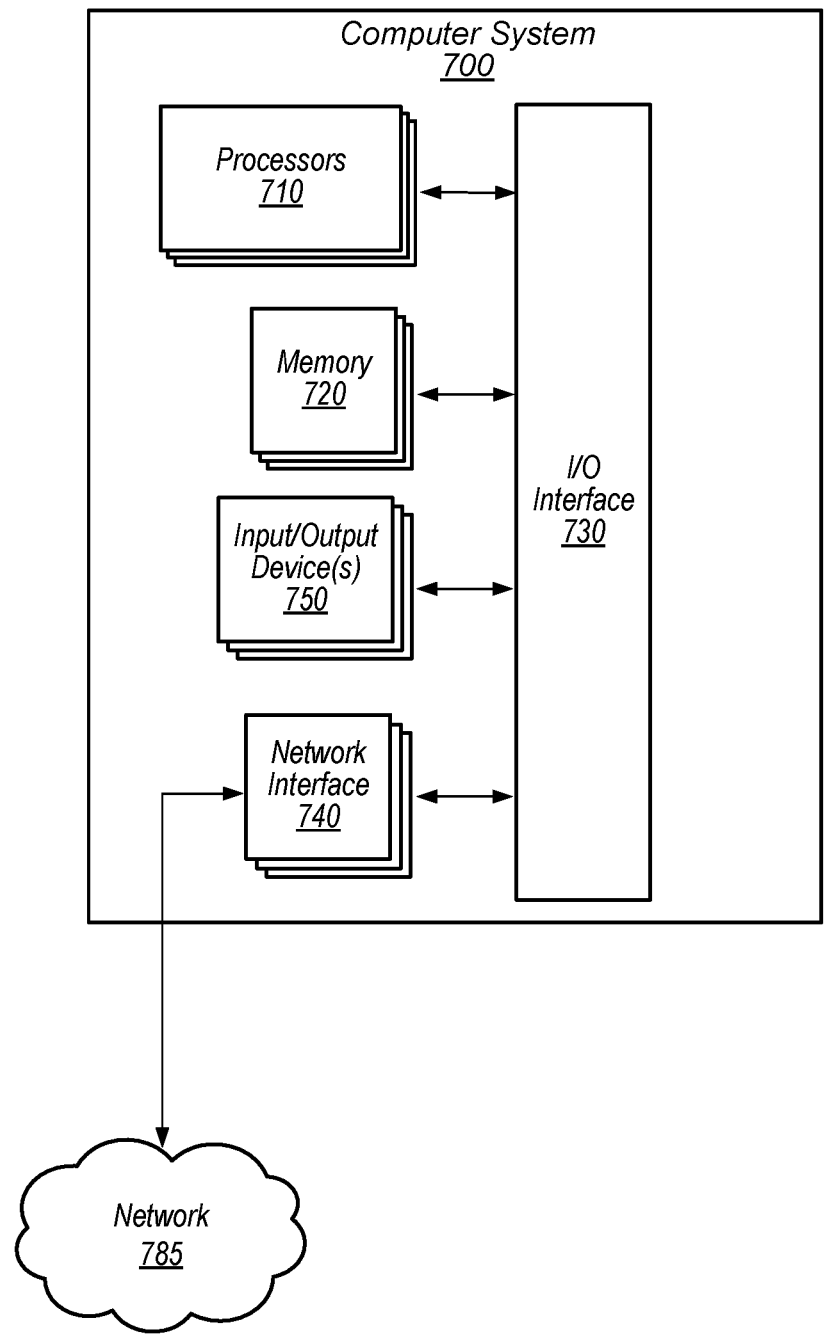
FIG. 7 illustrates a computer system that may be configured to include or execute any or all of the embodiments described herein.

FIG. 7 illustrates an example computer system 700 that may be configured to include or execute any or all of the embodiments described above. In different embodiments, computer system 700 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of automated capture of image data for points of interest may be executed in one or more computer systems 700, which may interact with various other devices. Note that any component, action, or functionality described above with respect to FIGS. 1 through 6 may be implemented on one or more computers configured as computer system 700 of FIG. 7, according to various embodiments. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices, which can include one or more user interface (also referred to as "input interface") devices. In some cases, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions, data, etc. accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 720 may be configured to implement some or all of an automated image capture system, incorporating any of the functionality described above. Additionally, existing control data of memory 720 may include any of the information or data structures described above. In some embodiments, program instructions and/or data may be received, sent or stored upon different types of computer-accessible media or on similar media separate from system memory 720 or computer system 700. While computer system 700 is described as implementing the functionality of functional blocks of previous Figures, any of the functionality described herein may be implemented via such a computer system.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network 785 (e.g., carrier or agent devices) or between nodes of computer system 700. Network 785 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 700. Multiple input/output devices may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

Memory 720 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 700 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

Various ones of the methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Boundaries between various components and operations are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. An apparatus, comprising:
    an automated image capture system installed in a vehicle, the automated image capture system configured to:
        detect a point of interest located external to the vehicle, based, at least in part, on a determination that the location of the vehicle is within a proximity of the point of interest;
        capture image data of the point of interest via at a sensor configured to monitor an external environment of the vehicle;
        generate metadata to describe the point of interest, the metadata comprising a point of interest location and time; and
        add the captured image data and the metadata to a collection of other image data and corresponding other metadata stored for one or more other points of interest captured during a same journey of the vehicle.

2. The apparatus of claim 1, wherein the automated image capture system is further configured to:
    receive, via a user interface for the automated image capture system, a request to capture image data for another point of interest; and
    in response to the receipt of the request, perform the capture of the image data, the generation of the metadata and the storage of the captured image data and the metadata for the other point of interest.

3. The apparatus of claim 1, wherein the automated image capture system is further configured to:
    receive, via a user interface for the automated image capture system, a request to display the image data captured for the point of interest; and
    in response to the receipt of the request, display the image data via a display at the vehicle.

4. The apparatus of claim 1, wherein to add the captured image data and the metadata, the automated image capture system is configured to upload the captured image data and the metadata to a remote data store.

5. The apparatus of claim 1, wherein the automated image capture system is further configured to:
    receive, via a user interface for the automated image capture system, a request to edit the image data captured for the point of interest; and
    in response to the receipt of the request, perform the requested edit to the image data.

6. The apparatus of claim 1, wherein the automated image capture system is further configured to:
    generate, from the collection, a compilation of the image data and other image data for the point of interest and one or more other points of interest.

7. A method, comprising:
    performing, by one or more computing devices:
        detecting, at a vehicle, a point of interest located external to the vehicle, comprising determining that a location of the vehicle is within a proximity of the point of interest;
        capturing image data of the point of interest via sensor configured to monitor an external environment of the vehicle;
        generating metadata to describe the point of interest, the metadata comprising a point of interest location and time; and
        adding the captured image data and the metadata to a collection of other image data and corresponding other metadata stored for one or more other points of interest captured during a same journey of the vehicle.

8. The method of claim 7, wherein the method further comprises:
    receiving, via a user interface, a request to capture image data for another point of interest; and
    in response to receiving the request, performing the capturing of the image data, the generating of the metadata and the storing of the captured image data and the metadata for the other point of interest.

9. The method of claim 7, wherein the method further comprises:
    receiving, via a user interface, a request to display the image data captured for the point of interest; and
    in response to receiving the request, displaying the image data via a display at the vehicle.

10. The method of claim 7, wherein adding the captured image data and the metadata the automated image capture system comprises uploading the captured image data and the metadata to a remote data store.

11. The method of claim 7, wherein the method further comprises:
    receiving, via a user interface, a request to edit the image data captured for the point of interest; and
    in response to receiving the request, performing the requested edit to the image data.

12. The method of claim 7, wherein the method further comprises:
    generating a compilation of the image data and the other image data for the point of interest and the one or more other points of interest.

13. The method of claim 12, further comprising providing access to the compilation of the image data to one or more different computing devices.

14. A non-transitory, computer readable storage medium, storing program instructions that when executed by one or more computing devices cause the one or more computing devices to implement:
- detecting, at a vehicle, a point of interest located external to the vehicle, wherein, in the detecting the point of interest, the programming instructions cause the one or more computing devices to implement determining that a location of the vehicle is within a proximity of the point of interest;
- capturing image data of the point of interest via at least one of the sensors;
- generating metadata to describe the point of interest, the metadata comprising a point of interest location and time; and
- adding the captured image data and the metadata to a collection of other image data and corresponding other metadata stored for one or more other points of interest captured during a same journey of the vehicle.

15. The non-transitory, computer readable storage medium of claim 14, wherein the program instructions cause the one or more computing devices to implement:
- receiving, via a user interface, a request to capture image data for another point of interest; and
- in response to receiving the request, performing the capturing of the image data, the generating of the metadata and the storing of the captured image data and the metadata for the other point of interest.

16. The non-transitory, computer readable storage medium of claim 14, wherein the program instructions cause the one or more computing devices to implement:
- receiving, via a user interface, a request to display the image data captured for the point of interest; and
- in response to receiving the request, displaying the image data via a display at the vehicle.

17. The non-transitory, computer readable storage medium of claim 14, wherein in adding the captured image data and the metadata the automated image capture system, the program instructions cause the one or more computing devices to implement uploading the captured image data and the metadata to a remote data store.

18. The non-transitory, computer readable storage medium of claim 14, wherein the program instructions cause the one or more computing devices to implement:
- receiving, via a user interface, a request to edit the image data captured for the point of interest; and
- in response to receiving the request, performing the requested edit to the image data.

19. The non-transitory, computer readable storage medium of claim 14, wherein the program instructions cause the one or more computing devices to further implement:
- generating a compilation of the image data and the other image data for the point of interest and the one or more other points of interest.

20. The non-transitory, computer readable storage medium of claim 19, wherein the program instructions cause the one or more computing devices to further implement providing access to the compilation of the image data to one or more different computing devices.

* * * * *